United States Patent [19]

Verbos

[11] Patent Number: 4,841,215
[45] Date of Patent: Jun. 20, 1989

[54] D.C. SOLENOID CONTROL CIRCUIT

[75] Inventor: Stephen P. Verbos, Spring Lake, Mich.

[73] Assignee: Lift Tech International Inc., Muskegon, Mich.

[21] Appl. No.: 65,333

[22] Filed: Jun. 22, 1987

[51] Int. Cl.[4] .............................................. H02P 3/18
[52] U.S. Cl. ..................................... 318/757; 318/762; 307/22
[58] Field of Search ............... 318/757, 758, 759, 760, 318/761, 762; 307/11, 12, 13, 14, 15, 21, 22; 361/144, 146; 363/13, 63

[56] References Cited

U.S. PATENT DOCUMENTS

| | | | |
|---|---|---|---|
| 2,493,670 | 1/1950 | Harvey et al. | 318/762 |
| 2,525,541 | 10/1950 | Grepe | 318/762 |
| 2,847,630 | 8/1958 | Holt et al. | 318/757 |
| 2,929,977 | 3/1960 | Choudhury | 318/762 |
| 2,938,677 | 5/1960 | Flan et al. | 318/762 |
| 3,045,166 | 7/1962 | Robinson | 318/757 |
| 3,049,656 | 8/1962 | Zollinger | 318/757 |
| 3,313,992 | 4/1967 | Bohn | 318/762 |
| 3,548,290 | 12/1970 | Swinehart | 323/239 |
| 3,576,443 | 4/1971 | Brown | 307/12 |
| 3,657,622 | 4/1972 | Revland et al. | 318/237 |
| 4,110,676 | 8/1978 | Edick et al. | 322/31 |
| 4,168,611 | 9/1979 | Woyton et al. | 60/413 |
| 4,305,030 | 12/1981 | Lorenz | 318/758 |
| 4,482,853 | 11/1984 | Bhavsar | 318/778 |
| 4,489,257 | 12/1984 | Lindow | 318/258 |
| 4,509,620 | 4/1985 | Verbos | 188/171 |
| 4,556,199 | 12/1985 | Dansie et al. | 254/348 |
| 4,560,913 | 12/1985 | Min | 318/760 |
| 4,574,899 | 3/1986 | Griffin | 177/211 |
| 4,587,604 | 5/1986 | Nerone | 363/17 |

FOREIGN PATENT DOCUMENTS 1459599 12/1976 United Kingdom ................ 318/757

Primary Examiner—William M. Shoop, Jr.
Assistant Examiner—Brian K. Young
Attorney, Agent, or Firm—Basile and Hanlon

[57] ABSTRACT

A D.C. solenoid control circuit for use in mechanisms driven by an A.C. motor. A rectifier converts A.C. current to D.C. current and provides an A.C. current flow path and a D.C. current flow path. Only the motor is connected in the A.C. current flow path to an output electrical power source. The D.C. solenoid is connected through the rectifier in the D.C. current flow path. The D.C. solenoid winding drives an actuator within the solenoid the activate the separate mechanism. In-rush current drawn by the motor upon start-up is converted to a high current level by the rectifier and input to the winding of the solenoid causing its immediate energization and, upon de-activation, its fast release.

5 Claims, 2 Drawing Sheets

D.C. SOLENOID CONTROL CIRCUIT

BACKGROUND OF THE INVENTION

1. Field of the Invention

This invention relates, in general, to electrical control circuits and, more specifically, to electrical control circuits for D.C. powered solenoids.

2. Description of the Prior Art

Spring assisted, electro-magnetically released brakes have long been used in brake assemblies for electric hoists. Such brake assemblies typically include a biased brake lever which operates a brake shoe and urges a disk into or out of engagement with a fixed brake drum to control braking and movement of a load such as an electrical hoist. An electrically actuated solenoid is commonly employed to move the spring and cause pivotal movement of the brake lever.

Solenoids typically are formed with a coil or winding which drives an actuator and it has long been recognized that such coils require a high amount of current during start-up relative to the normal holding current. As such solenoids have been used in braking circuits, "forcing" circuits have been required to provide the sufficiently high "in rush" current to the solenoid coil required to provide more rapid actuation of the solenoid. After the solenoid is actuated, a much smaller amount of "holding" current is required to keep the solenoid in its "holding" position. By reducing the electrical power provided to the solenoid during the "holding" period, less heat dissipation capability is required of the solenoid and less energy must be dissipated during de-energization which allows for a more rapid release of the solenoid. To meet these requirements, the forcing circuits include many elements. However, the deletion of such circuits leads to a larger overall size for a solenoid, and requires higher forcing and holding currents, thereby resulting in a slower release of the solenoid.

Thus, it would be desirable to provide a D.C. solenoid circuit which overcomes the problems encountered with previously devised D.C solenoid control circuits. It would also be desirable to provide a D.C. solenoid control circuit which is designed to provide rapid energization and thus actuation of the solenoid as well as a fast release of the solenoid upon de-energization. Finally, it would be desirable to provide a D.C. solenoid control circuit which has a simplified construction resulting in a small size.

SUMMARY OF THE INVENTION

The present invention is a control apparatus controlling the operation of a D.C. solenoid connection used in a mechanism in which an A.C. motor is the driving force.

The solenoid winding consist of multi-turns of wire having two leads to provide energization of the winding. One of the leads of the winding is connected to the positive terminal of the rectifier. The other lead of the winding is connected to the negative terminal of the rectifier. The rectifier is a device having four leads, a positive lead, a negative lead and two A.C. leads. One of the A.C leads is connected to the A.C power supply. The other A.C. lead is connected to the motor.

The unique D.C. solenoid control circuit of the present invention affords many advantages over previously devised D.C. solenoid control circuits which previously have required complex "forcing" circuits to provide rapid energization of the solenoid. Further, this rapid actuation is achieved by means of a very simplified circuit thereby permitting low induction, fewer number of parts and an overall smaller size for the solenoid. This is achieved by making use of the high in-rush current drawn by the A.C. motor during start-up. This is applied as a D.C. current through the rectifier to provide the desired rapid energization of the solenoid. When the motor reaches full speed, the current drops to a relatively low level compared to the "high in-rush" current and thus the current through the rectifier and the solenoid also drops. This provides a sufficient holding current at low energy level, resulting in low heat loss and enables rapid release of the solenoid upon de-energization of the motor.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
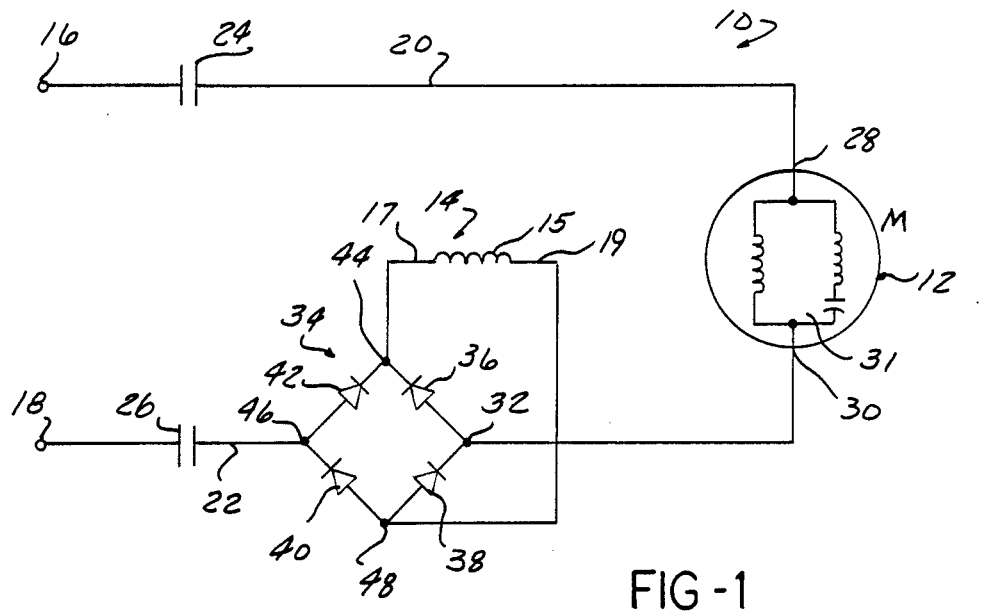
FIG. 1 is a schematic view showing one embodiment of the D.C. solenoid control circuit of the present invention.

Throughout the following description and drawing, an identical reference number is employed to refer to the same component used in multiple figures of the drawing.

In general, the D.C solenoid control circuit of the present invention is advantageously used in a mechanism employing an A.C. motor coupled to a load and also includes a solenoid operated device associated with the operation of the load.

By example only, and not limitation, the D.C. solenoid control circuit of the present invention is described in use with a motor operated disc brake and a brake in an electrically operated hoist which also includes a D.C. solenoid operating a brake disk connected to the brake.

Referring to FIG. 1, there is illustrated a D.C. solenoid control circuit 10 used in connection with a single phase motor 12 which is fixedly connected to a disc brake, not shown, which is part of an electrically operated hoist. The motor 12 operates to control the rotation and the raised or lowered positions of the disc brake and hoist.

Also included in the D.C. control circuit 10 is a D.C. operated solenoid 14 which contains a winding 15. The winding 15 consist of multiple turns of wire which terminate in two leads 17 and 19, with the actuator being connected to an operative device, as described below.

Input power from an alternating current, single phase electrical power source, is applied to the circuit 10 through first and second terminals 16 and 18. The terminals 16 and 18 are connected to first and second conductors 20 and 22 via motor starter contacts 24 and 26, respectively, which are operatively opened or closed by a conventional motor starter relay, not shown. One end of the first conductor 20 is connected to one of the leads 28 on the motor 12. Means 34, responsive to the flow of A.C. current through the A.C. motor 12, is provided for converting the A.C. current to a D.C. current directly with changes in the flow of current through the A.C. motor 12. The converting means 34 provides an A.C. current flow path and a D.C. current flow path.

The winding 15 of the D.C. solenoid 14 is connected in series with the D.C. current flow path while one of the leads of the A.C. motor 12 is connected to the second input power terminal via the A.C. current flow path through the converting means 34. In the preferred embodiment, the coverting means 34 comprises a full wave bridge rectifier. The converting means 34 is responsive to the flow of A.C. current through the motor 12, converts the A.C. current to a D.C. current and applies the current to the winding 15 of the D.C. solenoid 14 in the same proportion as the A.C. current applied to the motor 12 directly with changes in the flow of current to the A.C. motor 12.

The rectifier 34 is formed of four diodes 36, 38, 40 and 42 connected in a conventional full wave rectifying bridge. The leads of the diodes 36, 38, 40 and 42 are joined at terminals, such as terminal 32 between diodes 36 and 38, terminal 44 between the ends of the leads of the diodes 36 and 42, terminal 46 between the ends of the leads of the diodes 40 and 42 and the terminal 48 between diodes 38 and 40.

An A.C. current flow path is formed through diodes 36 and 40, and diodes 38 and 42.

The winding 15 of the solenoid 14 has its leads 17 and 19 connected between the terminals 44 and 48 of rectifier 34, respectively, as shown in FIG. 1. The second conductor 22 from the power source terminal 18 is connected through the motor starter contacts 26 to the terminal 46 in the rectifier 34. The other lead 30 of the motor 12 is connected to terminal 32 of the rectifier 34.

Figure 2:
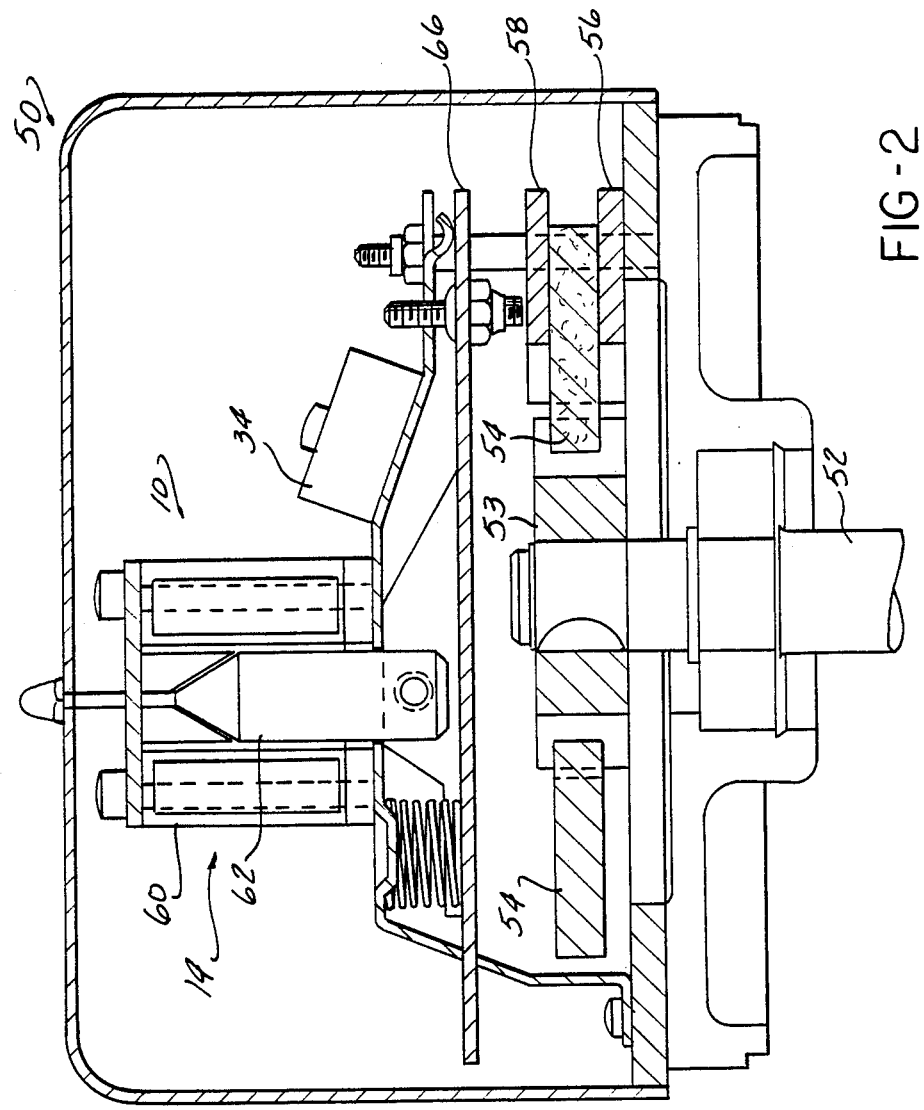
FIG. 2 is a sectional view of a brake employed in an electrically operated hoist employing the D.C. solenoid control circuit of the present invention.

Referring briefly to FIG. 2, there is depicted an example of a spring-assisted, electro-mechanically released brake mechanism 50 with the D.C. solenoid control circuit 10 mounted therein. The brake 50 has a rotatable shaft 52 which extends outward from one end of the brake 50 and is operably attached to the splined hub 53 of the brake which, in turn, carries a disk 54. Inner and outer pressure pads 56 and 58 surround the disk 54 on opposite sides thereof. A lever 66 is provided to release the pressure from the outer pressure pad 58 away from the disk 54.

A D.C. operated solenoid 60 is mounted within the housing of the brake 50 and acts to pivot the lever 66 about its fulcrum point. An armature 62 is mounted within the solenoid 60 and acts upon the lever. The armature 62 in its inactivated state moves toward the disk 54 and brings the outer pressure pad 58 into engagement with the disk 54 to apply the brake 50 by transmitting force from the lever arm 60 to clamp the disk 54 between the inner and outer pressure pads 56 and 58. Activation of the solenoid 60 releases the brake 50 to permit the outer pressure pad 54 to move away from the disk 58 thereby allowing rotation of the shaft 52. Also shown in FIG. 2 is the rectifier 34 shown and described above in FIG. 1.

In operation A.C. current flows through two paths. Input current is applied to terminal 16 through contact 24 along conductor 20 through motor winding 31, along conductor 30 through diode 36 in rectifier 34 through lead 17 through coil winding 15 of solenoid 14, through lead 19 through diode 40 through line 22 through contact 26 to terminal 18.

When current flow reverses, current flows through contact 26 through diode 42 of rectifier 34 through lead 17, through coil winding 15 of solenoid 14, through lead 19 through diode 38 of rectifier 34 through lead 30 through motor winding 31 of motor 12 through conductor 20 through contact 24 to input 16.

In this process A.C. power is supplied to winding 31 of motor 12 while supplying D.C. power to coil winding 15 of solenoid 14.

When the motor 12 is initially energized, a high in-rush current occurs. This in-rush current is rectified to a D.C. current in the same amount by the rectifier 34 and applied to the solenoid 14 causing its immediate energization as described above. When the motor 12 reaches its full running speed, the current drawn by it drops to a relatively low level relative to the high in-rush current. This low A.C. running current is converted to a D.C. current by the rectifier 34 and applied to the solenoid 14. This forms a low level "holding current" to hold the solenoid 14 in its actuated position.

When the motor 12 is de-energized, current rapidly ceases to flow in the solenoid winding 15 and due to its previous low level holding current results in a rapid release of the solenoid 14.

Figure 3:
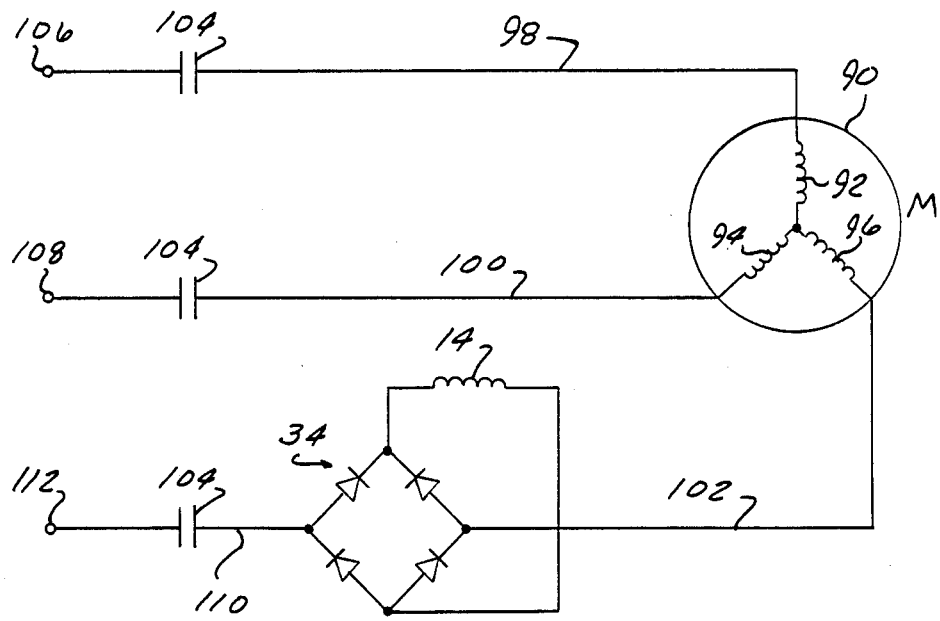
FIG. 3 is a schematic drawing of another application of the D.C. solenoid control circuit of the present invention employed with a three-phase A.C. motor.

Referring now to FIG. 3, there is illustrated another application of the present D.C. solenoid control apparatus with a three-phase motor 90. The individual windings 92, 94 and 96 of the motor 90 are connected to individual conductors 98, 100 and 102, respectively. The first and second conductors 98 and 100 are connected through motor starter contacts 104 to input electrical power leads 106 and 108, respectively.

The D.C. control circuit shown in FIG. 3 also includes the rectifier 34 identical to that described above and shown in FIG. 1 and a solenoid 14 whose plunger 62 is connected to an operative device in the brake mechanism. An output conductor 110 is connected to one of the terminals of the bridge rectifier 34 and connected through associated motor starter contacts 104 to an input terminal 112.

This circuit operates in the same manner as that described above insofar as enabling A.C. operation of the A.C. three-phase motor 90 and yet providing a D.C. current consistent with the in-rush current through the motor and cessation of current from the motor to operate an associated device with fast actuation as well as a fast release.

In summary, there has been disclosed a unique D.C. solenoid control circuit which provides D.C. power to a solenoid in a circuit containing an A.C. motor, such as that typically employed in brake mechanisms for electric hoists. The D.C. solenoid control circuit has a simplified construction with a small number of parts which provide for reduced size and low induction. The control circuit is designed such that the high in-rush current drawn by the A.C. motor during start-up is applied directly to the D.C. solenoid resulting in rapid energization of the solenoid. Due to the low induction of the solenoid when the motor is de-energized, the solenoid is rapidly released from its holding position.

What is claimed is:

1. A control apparatus comprising: an A.C. motor with first and second input leads;
 a D.C. solenoid having a winding, the solenoid operating a device;
 a source of A.C. electrical power;

means, responsive exclusively to the flow of A.C. current through the motor, for converting the A.C. current to a D.C. current, the converting means providing an A.C. current path and a D.C. current path;

means for exclusively supplying A.C. electrical power to the A.C. motor, the A.C. power supplying means including:

the A.C. electrical power source connected to first and second terminals;

a first conductor connected to the first terminal and one of the A.C. motor leads;

a second conductor connected to the second terminal;

the other lead of the A.C. motor being connected solely through the A.C. current path provided by the converting means and the second conductor to the second terminal;

the D.C. current being supplied exclusively to the winding of the D.C. solenoid;

the D.C. solenoid being connected in series with the D.C. current path of the converting means.

2. A control apparatus comprising:

a single phase A.C. motor with first and second input leads;

a D.C. solenoid having a winding, the solenoid operating a device;

a source of A.C. electrical power;

means, responsive exclusively to the flow of A.C. current through the motor, for converting the A.C. current to a D.C. current, the converting means providing an A.C. current path and a D.C. current path;

means for exclusively supplying A.C. electrical power to the A.C. motor, the A.C. power supplying means including:

the A.C. electrical power source connected to first and second terminals;

a first conductor connected to the first terminal and one of the A.C. motor leads;

a second conductor connected to the second terminal;

the other lead of the A.C. motor being connected solely through the A.C. current path provided by the converting means and the second conductor to the second terminal;

the D.C. current being supplied exclusively to the winding of the D.C. solenoid; and the D.C. solenoid being connected in series with the D.C. current path of the converting means.

3. A control apparatus comprising:

a three-phase A.C. motor with three input leads;

a D.C. solenoid having a winding, the solenoid operating a device;

a source of A.C. electrical power;

means, responsive exclusively to the flow of A.C. current through the motor, for converting the A.C. current to a D.C. current, the converting means providing an A.C. current path and a D.C. current path;

means for exclusively supplying A.C. electrical power to the A.C. motor, the A.C. power supplying means including:

the A.C electrical power source connected to three terminals;

a pair of conductors connected to two of the terminals and two of the A.C. motor leads;

another conductor connected to the other terminal;

the other lead of the A.C. motor being connected solely through the A.C. current path provided by the converting means and the other conductor to the other of the terminals;

the D.C. current being supplied exclusively to the winding of the D.C. solenoid; and the D.C. solenoid being connected in series with the D.C. current path of the converting means.

4. The control apparatus of claim 2 wherein: converting means ia full wave, bridge rectifier.

5. In an electrically operated brake assembly comprising:

a rotatable brake disc;

an A.C. motor drivingly coupled to the brake disc;

a brake releasably engaged with the brake disc;

a brake release mechanism releasably engaged with the brake;

an A.C. motor having first and second output leads;

a D.C. solenoid having a winding, the D.C. solenoid operating a device controlling the brake release mechanism;

a source of A.C. electrical power;

means, responsive exclusively to the flow of A.C. current through the motor, for converting the A.C. current to a D.C. current, the converting means providing an A.C. current path and a D.C. current path;

means for exclusively supplying A.C. electrical power to the A.C. motor, the A.C. power supplying means including:

the A.C. electrical power source connected to first and second terminals;

a first conductor connected to the first terminal and one of the A.C. motor leads;

a second conductor connected to the second terminal;

the other lead of the A.C motor being connected solely through the A.C. current path provided by the converting means and the second conductor to the second terminal;

the D.C. current being supplied exclusively to the winding of the D.C. solenoid;

the D.C. solenoid being connected in series with the D.C. current path of the cuonverting means.

* * * * *